United States Patent [19]

Melen et al.

[11] Patent Number: 5,257,323
[45] Date of Patent: Oct. 26, 1993

[54] SELECTION AGENT FOR A SYMBOL DETERMINATION SYSTEM WITH MULTIPLE CHARACTER RECOGNITION PROCESSORS

[75] Inventors: Roger D. Melen; Harry T. Garland, both of Los Altos Hills, Calif.

[73] Assignee: Canon Kabushiki Kaisha, Palo Alto, Calif.

[21] Appl. No.: 707,035

[22] Filed: May 29, 1991

[51] Int. Cl.$^5$ .............................................. G06K 9/62
[52] U.S. Cl. ........................................ 382/39; 382/57; 382/10
[58] Field of Search .................. 382/57, 39, 37, 10, 382/36, 14, 30, 11, 13

[56] References Cited

U.S. PATENT DOCUMENTS

| | | | |
|---|---|---|---|
| 2,978,675 | 5/1961 | Highleyman | 382/39 |
| 3,341,814 | 9/1967 | Chao Kong Chow | 382/39 |
| 3,832,683 | 8/1974 | Nadler et al. | 382/39 |
| 3,988,715 | 10/1976 | Mullan et al. | 382/40 |
| 4,876,735 | 8/1974 | Matrin et al. | 382/39 |
| 4,958,379 | 9/1990 | Yamaguchi et al. | 382/57 |

Primary Examiner—Michael T. Razavi
Assistant Examiner—Steven Klocinski
Attorney, Agent, or Firm—Paul Hentzel

[57] ABSTRACT

A selection agent within a symbol determination system receives input character codes (ICCs) each with an associated confidence factor (CF) from a plurality of OCR processors. The selection agent selects the mathematically most probable character (MPC) from among the ICCs based on the relative values of the joint confidence factor (JCF) in accordance with the relationship:

$$JCF_n = 1 - (1-CF_1)(1-CF_2)\ldots(1-CF_n).$$

for n like ICCs from N OCR processors.

24 Claims, 3 Drawing Sheets

SELECTION AGENT FOR A SYMBOL DETERMINATION SYSTEM WITH MULTIPLE CHARACTER RECOGNITION PROCESSORS

TECHNICAL FIELD

This invention relates to optical character recognition (OCR) systems, and more particularly to such systems having a selection agent which identifies the mathematically most probable symbol candidate from a plurality of OCR processors.

BACKGROUND

Heretofore individual OCR processors were employed to recognize symbol image data in the form of bit maps of characters, as described in U.S. Pat. No. 5,046,116 issued Sep. 3, 1991 entitled SYMBOL ANALYZING SYSTEM AND METHOD WITH DATA EXCLUSION AND CONFIDENCE FACTORS, SN 07/627,336 filed 14 December 1990 by the present assignee. These individual processors were not employed as an array of processors with a selection agent to collectively identify the input image.

SUMMARY

It is therefore an object of this invention to provide an improved selection agent for a symbol determination system having a plurality of symbol candidates.

It is another object of this invention to provide such a selection agent which selects symbol candidates based on confidence factors associated with each candidate.

It is another object of this invention to provide such a selection agent which bases the selection on the joint confidence factor of a group of like candidates.

It is another object of this invention to provide such a selection agent which bases the selection on the joint error factor of a group of like candidates.

It is another object of this invention to provide such a selection agent which selects the mathematically most probable candidate from a plurality of candidates.

Briefly, these and other objects of the present invention are accomplished by providing a character selection agent which receives input character codes (ICCs) from a plurality of OCR processors. The selection agent selects the mathematically most probable code (MPC) from among the plurality of ICCs based on a confidence factor (CF) associated with each ICC. An input means of the selection agent receives the ICCs and the associated CFs into a plurality of input positions A sorter sorts the ICCs into groups of identical codes, for storage in a sort memory. A joint confidence factor (JCF) calculator determines the JCF of each group of identical codes based on the CF of the ICCs in each group. An advance circuit advances each group of ICCs to the JCF calculator means for determination of the group JCF. An output means receives the JCFs from the JCF calculator means and selects the MPC based on the relative JCFs.

BRIEF DESCRIPTION OF THE DRAWING

Further objects and advantages of the present invention and the operation of the selection agent will become apparent from the following detailed description and drawing in which.

Figure 1:
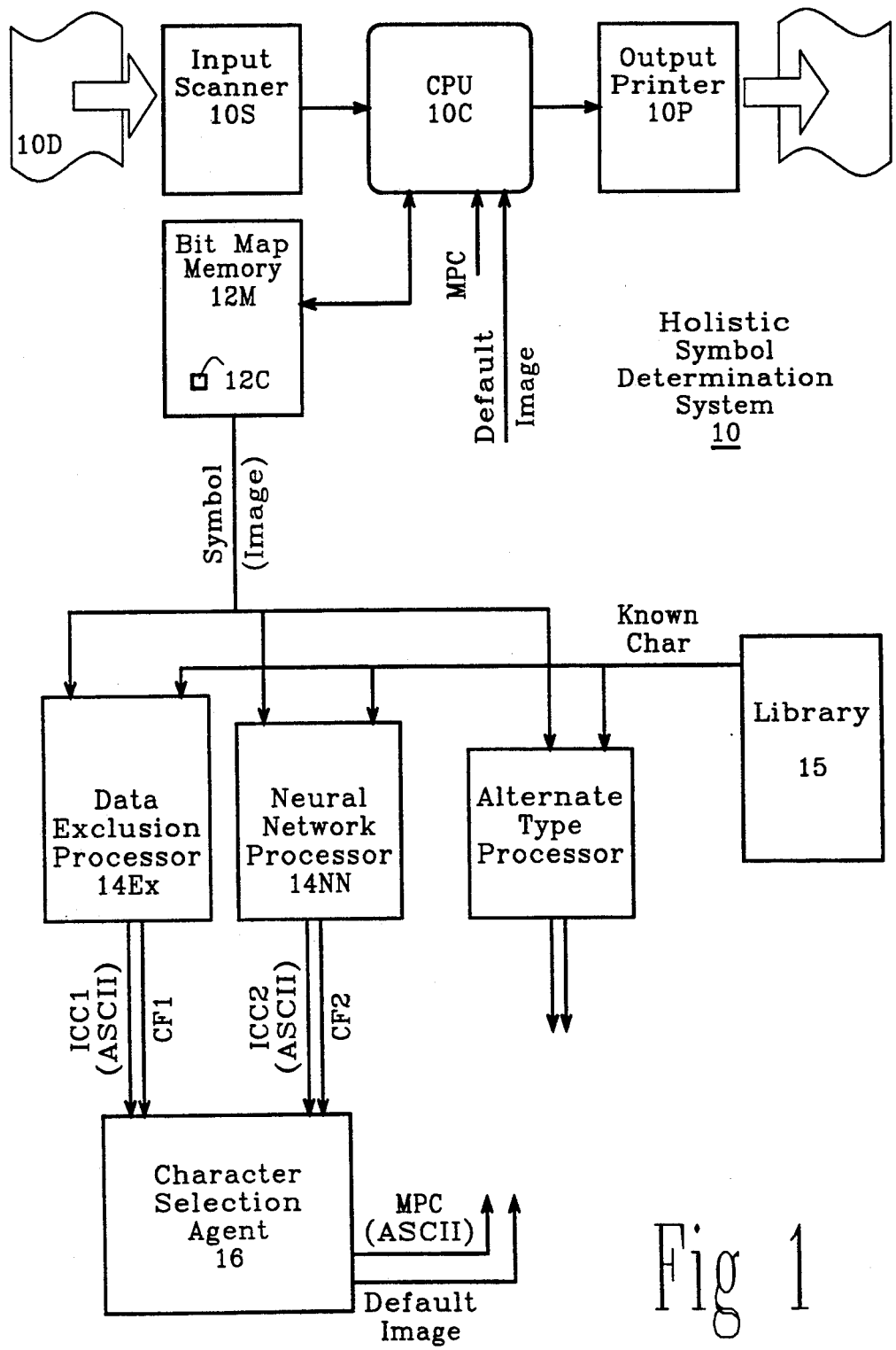
FIG. 1 is a block diagram of a symbol determination system showing the character selection agent 16.

The elements of the invention are designated by two digit reference numerals. The first digit indicates the Figure in which that element is first disclosed or is primarily described. The second digit indicates like features and structures throughout the Figures. Some reference numerals are followed by a letter which indicates a sub-portion or feature of that element.

SYMBOL DETERMINATION SYSTEM (FIG. 1)

Holistic symbol determination system 10 receives the text and/or graphic content of documents 10D via input scanner 10S into CPU 10C, and stores the resulting image in bit map memory 12M. The symbol or character cells 12C within the bit map are identified by isolation software and presented to a plurality of suitable optical character recognition (OCR) processors such as Data Exclusion Processor 14Ex and Neural Network Processor 14NN. Character selection agent 16 selects the mathematically Most Probable Character (MPC) from among the processor outputs, for storage by the CPU or for printing at output printer 10P.

The bits in the character image are presented to the OCR processors and systematically retrieved and examined by each processor. The character data generated by each processor is compared to corresponding character data from a set of known or defined reference characters stored in library 15. Each OCR processor then establishes the best match character for the presented image based on which character in the reference set most resembles the presented image as examined by that processor. The best matched character output then becomes an input character code (ICC) a candidate for selection by selection agent 16. The candidates are expressed in a suitable binary code system such as ASCII code or compressed ASCII code.

There are many classes of OCR processors, each employing a different approach to character recognition. Data exclusion processor 14Ex examines the spectral power of the presented image to derive line width and line count information. The spectral power is progressively reduced to exclude image data and generate a confidence factor as described in U.S. Pat. No. 5,046,116 issued Sep. 3, 1991 entitled SYMBOL ANALYZING SYSTEM AND METHOD WITH DATA EXCLUSION AND CONFIDENCE FACTORS, Ser. No. 07/627,336 filed 14 December 1990 by the present assignee. Neural network processor 14NN is an adaptive artificial intelligence embodiment employing matching processes inherent in biological nervous systems.

Preferably the OCR processors within a particular holistic determination system are not identical or even functionally equivalent. The processors are specifically chosen from different classes to present an array of optical character recognition principles with overlapping competence profiles. The processors in the array may have broad overlapping regions of high competence and narrow non-overlapping regions of limited competence.

Each OCR class of processors has a unique approach to symbol recognition with special features and capabilities. The moment and weighting OCR approach determines the distribution of the pigment forming the image, and is particularly proficient at image intensity and greyscale matters. However the moment approach does not handle the "roundness" issue as well as other OCR approaches. The edge examination OCR approach focuses on the edges of the image to resolve inside edges from outside edges. The edge approach is not particularly proficient in examining short strokes or long strokes. Other OCR approaches concern extracting line features and extracting circles.

The individual competence profile of the processors complement one another to provide a well rounded collective competence profile In most cases the OCR processors will establish the same best matched character and ICC candidate because the same image is presented to all of the processors. However, occasionally the candidates may not be the same because the original scanned image is poor or the symbol format is unusual. The candidate may be in a low-competence region for one of the processors causing the candidate to be interpreted differently by different processors. The resulting candidate conflict is resolved by examining the confidence factors.

CONFIDENCE FACTORs—CFs

The processors generate a Confidence Factor (CF) associated with each input character code (ICC) candidate, indicating the probable accuracy of each ICC as the correct ASCII code of the presented image. The CF values are related to the Probability (P) of the correctness of the ICC candidates. That is:

Confidence Factor = $K \times$ Probability
CF = $K \times P$ where
CF has an arbitrary value scale,
P has a minimum value approaching 0 for low CFs and a maximum value approaching 1 for high CFs, and
K is a coefficient of calibration.

The CF becomes identical to the P with proper calibration of the OCR processors. That is:

Calibrated Confidence Factor = Probability
$CF_{cal}$ = P

Calibrating an OCR processor involves calibration testing over long term periods by scanning special calibration documents. The correlation between the test produced CF and the empirically determined probability is observed. The CF is adjusted into normalization with the empirical probability at K=1.

In general, the probability P is a special case of the confidence factor CF. When calibrated at K=1, the CF is equal to the probability of correctness, and may be stated in terms of the probability of incorrectness or error "e":

$CF_{cal} = P = (1-e)$ where e approaches 0 for high CF. The probability of correctness plus the probability of incorrectness is always equal to unity:

$P + e = 1.$

A CF of P=0.99999 (e=0.00001) represents a candidate recognition rate of 99,999 correct symbols per 100,000 symbol images presented to the processor. Alternatively stated, P=0.99999 represents a candidate mis-recognition rate of one symbol in 100,000, or about one mis-recognition in every 50 pages on the average as shown in Table A.

TABLE A

| MIS-RECOGNITION RATES | | |
|---|---|---|
| Probability P | Error e | Mean Page Run Between Mis-recognitions |
| .99 | .01 | 0.05 |
| .999 | .001 | 0.5 |
| .999,9 | .000,1 | 5 |
| .999,99 | .000,01 | 50 |
| .999,999 | .000,001 | 500 |
| .999,999,9 | .000,000,1 | 5,000 |

Table A is based on an 8.5"×11" page of typed material, single spaced, containing about 2,000 characters.

JOINT CONFIDENCE FACTORs—JCFs

When two OCR processors establish the same candidate as the ICC candidate, their Joint Confidence Factor (JCF) is greater then either of the individual CFs. The JCF is expressed by the JCF relationship:

$JCF_2 = 1 - (1 - CF_1)(1 - CF_2).$

The general JCF equation for n terms n like candidates from N OCR processors) is:

$JCF_n = 1 - (1 - CF_1)(1 - CF_2) \ldots (1 - CF_n).$

For a calibrated system where the CF is equal to the probability the JCF equation becomes the Joint Probability (JP) equation:

$JP_2 = 1 - (1 - P_1)(1 - P_2)$

The general JP equation for n terms n like candidates from N OCR processors) is:

$JP_n = 1 - (1 - P_1)(1 - P_2) \ldots (1 - P_n).$

The JP equation may be simplified by substituting in the probability of incorrectness:

$JP_2 = 1 - (e_1)(e_2)$ where the two e terms are multiplied forming a single error product term.

The general JP error equation for n terms n like candidates from N OCR processors) is:

$JP_n = 1 - (e_1)(e_2)(e_3) \ldots (e_n)$

The e product term defines the Joint Error Probability ($Jep_n$) and contains the candidate fidelity information:

$JP_n = 1 - Jep_n$

The $Jep_n$ term approaches 0 for larger CFs and higher values of n.

The JP of a group of candidates is a more accurate measure of likelihood then the single Ps of the individual candidates. The mathematically most probable candidate may not be apparent from examining the single Ps. For example, Table B shows the Ps and JPs for a three processor system in which each processor provides the four most promising candidates in order of decreasing probability.

TABLE B

| | O Q G C example | | | |
|---|---|---|---|---|
| | 1st Proc P/e | 2nd Proc P/e | 3rd Proc P/e | JP/JeP |
| "O" | .39/.61 | .43/.53 | .33/.67 | .78/.22 |
| "Q" | .24/.76 | .52/.48 | .15/.85 | .69/.31 |
| "G" | .25/.75 | .03/.97 | .47/.53 | .61/.39 |
| "C" | — | .02/.98 | .05/.95 | .07/.93 |
| "D" | .12/.88 | — | — | .12/.88 |

The mathematically most probable candidate in the above Table B—OQGC example is "O" with JP=0.78. The candidates with the highest single probability are "Q" with P=0.52 and "G" with P=0.47. The First Processor has a region of limited competance of round symbols, and was the only processor to provide a "D" response to the input image data.

The generally low Ps and JPs in the Table B example represent a poor input image situation generated from a scanned document with low quality print. Documents in general use have higher quality print and yield a more typical OQGC example with JP=0.999 and Table D (six 9s) shows an example with JP=0.999,999.

TABLE C

| | (three 9s) - O Q G C example | | | |
|---|---|---|---|---|
| | 1st Proc P/e | 2nd Proc P/e | 3rd Proc P/e | JP/JeP |
| "O" | .90/.10 | .90/.10 | .90/.10 | .999/.001 |
| "Q" | .05/.95 | .07/.93 | .03/.97 | .143/.857 |
| "G" | .03/.97 | .02/.98 | .04/.96 | .087/.913 |
| "C" | .02/.98 | .01/.99 | .03/.97 | .059/.941 |

TABLE D

| | (six 9s) - O Q G C example | | | | | | |
|---|---|---|---|---|---|---|---|---|
| | 1st Proc | | 2nd Proc | | 3rd Proc | | | |
| | P | e | P | e | P | e | JP | JeP |
| "O" | .990 | .010 | .990 | .010 | .990 | .010 | .999,999 | .000,001 |
| "Q" | .005 | .995 | .007 | .993 | .003 | .997 | .014,929 | .985,071 |
| "G" | .003 | .997 | .002 | .998 | .004 | .996 | .008,974 | .991,026 |
| "C" | .002 | .998 | .001 | .999 | .003 | .997 | .005,989 | .994,011 |

DEFAULT IMAGE MODE

Scanned text images may be ambiguous due to low quality input documents and non standard formats. When a best matched character and ICC cannot be determined (or a selection is otherwise not possible) the character selection agent goes into a non-recognition default mode. The selection agent forwards a Default Image signal instructing the CPU to print the bit ma of the character in place of the undetermined ASCII code. The CPU print output has a compound text format including character codes (such as eight bit ASCII) plus image data. The image data is preferably the address code identifying where the image bit map is located in the CPU memory. The image bit map may contain thousands of bits (such as 5,000 bits representing a 100 bit by 50 bit image). Image compression algorithms may be employed to reduced the memory requirements of the default image maps.

The selection agent may enter the default image mode in response to low CFs generated by poor matches in the OCR processors. ICC candidates having CFs or JCFs below a threshold value may be discarded as useless for selection purposes. The poor match may be caused by non-conventional characters which are not defined in the library, or unusual fonts beyond the recognition range of the processors. Poor matches may also be caused by impairments in the scanned medium such as folds, rips, punch holes, staple tears, and specks of foreign material. Impairments in the print may contribute to poor matching through distorted fonts, faded pigment, and loss of contrast because of faded pigment or yellowing pages.

CHARACTER SELECTION AGENT (FIG. 2A)

Character selection agent 16 sorts the ICC (input character code) candidates by character into groups of like characters, and then combines the CFs (or the Ps or the e terms) within each group to provide the group JCF (or the JP or the Jep).

Figure 2:
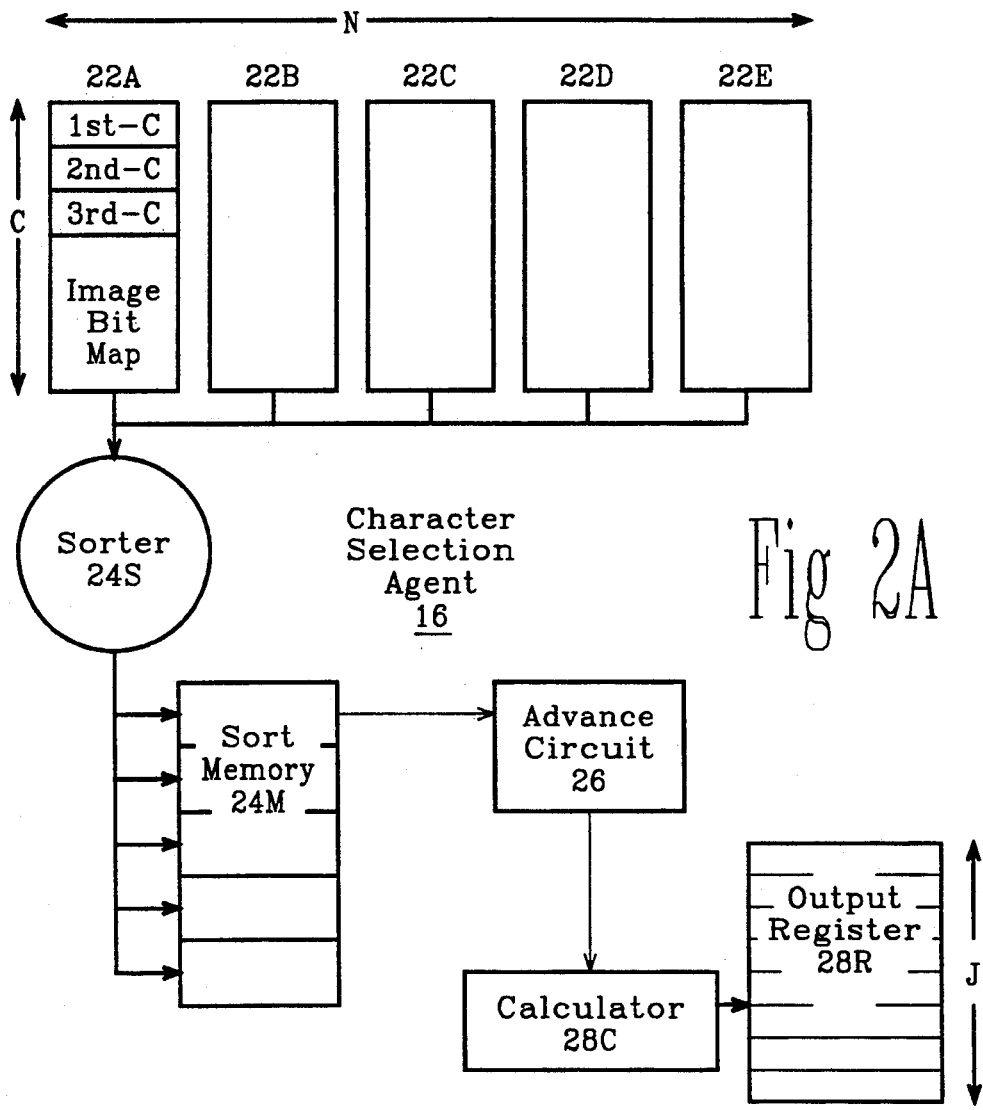
FIG. 2A is a block diagram of the selection agent of FIG. 1 showing the sorting circuit for arranging like candidates into groups.
FIG. 2B shows an embodiment of the data field format of the candidate data contained in the input register of FIG. 2A.
FIG. 2C shows an embodiment of the data field format of the group data contained in the output register of FIG. 2A; and, FIG. 3 is a block diagram of an advancing circuit for moving the candidates into the joint probability calculator by groups.

Input register 22 receive the ICC candidates from "N" OCR processors, each of which provide "C" levels of ICC choices. That is, the C best matches established by each OCR processor are received into the input register. In the embodiment of FIG. 2A, N=5 (with corresponding input sub-registers 22A, 22B, 22C, 22D and 22E), and C=3 (with corresponding register positions 1st-C, 2nd-C, and 3rd-C). The number of input candidates is NxC (5×3=15), which require an equal number of input positions.

Sorter 24S accesses each input position and sorts the candidates by character into locations within sort memory 24M. Identical candidates are sorted into adjacent locations in the sort memory forming the groups of like candidates. The search order of input register 22 by sorter 24S may be any suitable order; such as first to last, or highest CF to lowest CF, or 1st choices to 2nd choices to 3rd choices.

Advance circuit 26 sequentially advances each group of candidates to JCF calculator 28C for calculation of the group JCF based on the joint probability equation. Output register 28R stores "J" group candidates and associated JCFs. The output of the selection agent back to the CPU (see FIG. 1) may be the group candidate with the highest JCF, or the J highest JCFs. Alternatively the output may include all of the group candidates in order of JCF. For a complete pedigree of the original presented image, the output may include all of the information in input registers 22 including the address of the default image bit map.

DATA FIELDS (FIG. 2B and 2C)

Each ICC candidate in the input registers may have related data arranged in data fields (see FIG. 2B). Preferably the lead data field contains the ASCII code for the candidate (Can ASCII) followed by the CF of the candidate (Can CF). The address of the bit map of the presented image (Add DIm) in the CPU may be included for default image purposes, followed by a number or code identifying the processor (Pro Num) which generated the ASCII code.

In addition the ICC candidates may have related text control codes (Text Cont) for preserving text printing requirements or document status information. The text codes may include word processing requirements such as bold or underlined text, and document wide considerations such as line spacing and font type.

Each group candidate in output register 28R has corresponding related data such as the group ASCII code (Grp ASCII), the group joint confidence factor (Grp JCF), the default image address (Add DIm), and the text control codes (Text Cont). The processor number (Num Pro) is not applicable at the group level, and may be replaced by more useful information such as the number of candidates in the group (Num Can). The number of candidates is the number of CF terms in the CF equation, or the number of factors in JeP.

ADVANCE CIRCUIT (FIG. 3)

Figure 3:
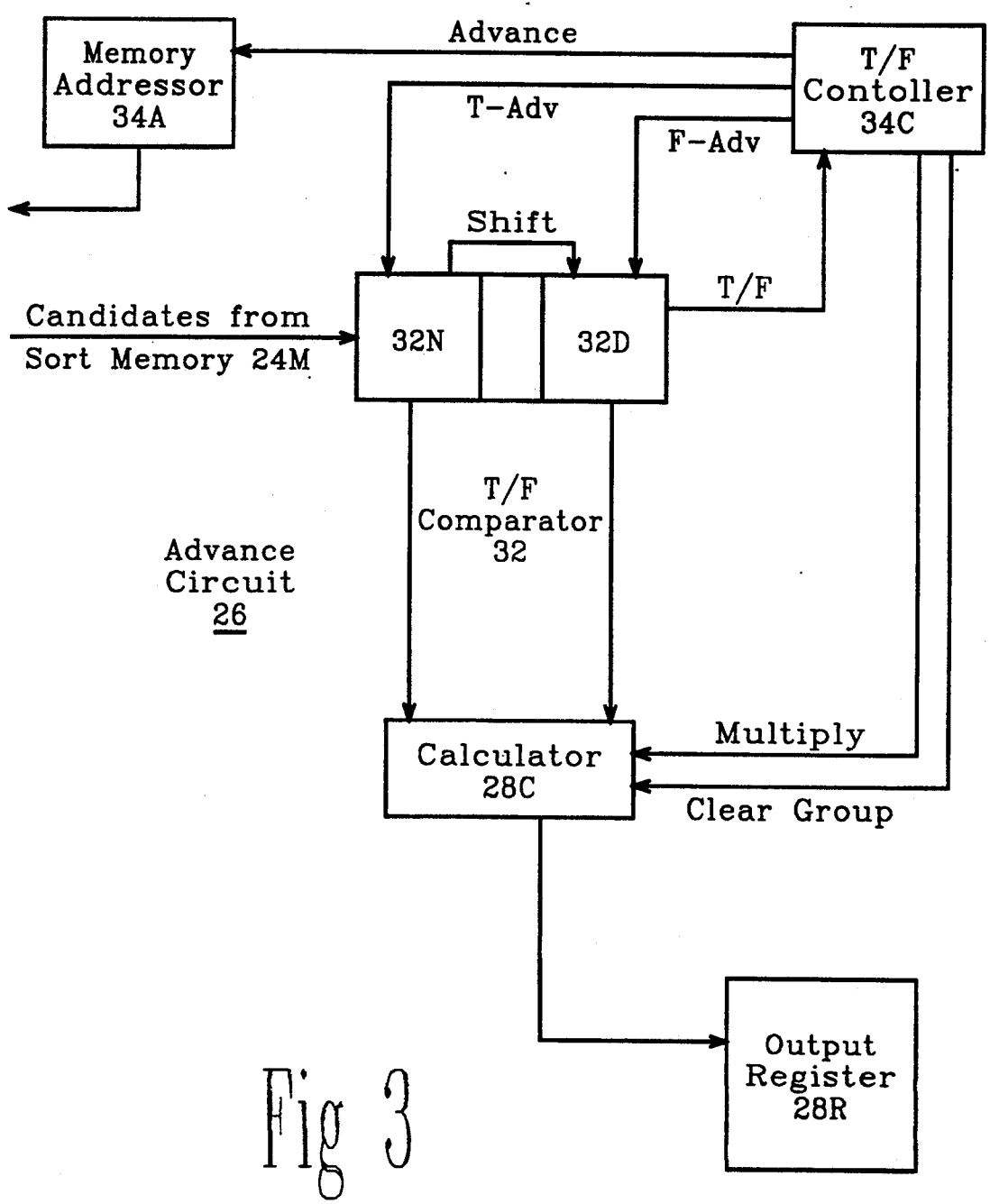

Advance circuit 26 sequentially accesses the candidates in sort memory 24M and loads them into a suitable group detection device such as true/false comparator 32 (see FIG. 3) for comparing ASCII codes. The comparator advances the candidates of each group to JCF calculator 28C for group multiplication and then to output register 28R.

The comparator has a dominant side 32D and a non-dominant side 32N. The first candidate from the first group in the sort memory is loaded into the non-dominant side and immediately shifts to the dominant side and simultaneously advances to the JCF calculator. This first candidate is the lead candidate of the first group and through comparison advances each candidate (like ASCII code) in its group and detects the lead candidate (unlike ASCII code) in the next group.

The next candidate in the first group is loaded into the non-dominant side for comparison with the lead candidate. The comparator determines whether the compare is true "T" or false "F". T/F controller 34C responds to the T/F output of the comparator by providing:

a "T-Adv" signal when the comparison is true, a "F-Adv" signal when the comparison is false, and an "Advance" signal in either case. If the compare is true (that is, the dominant side matches the non-dominant side), the candidate in the non-dominant side advances to the JCF calculator (T-Adv), and the next candidate from the sort memory loads into the non-dominant side. For each true compare, the T/F controller provides a "Multiply" signal to the JCF calculator causing a multiplication between the advanced candidate and the product in the calculator.

If the compare is false (that is, the dominant side does not match the non-dominant side), the candidate in the non-dominant side shifts a(F-Adv) dominant side displacing the old lead candidate. Memory addresser 34A is incremented by each Advance signal to access the next candidate in the sort memory, which is loaded into the non-dominant side. For each false compare, the T/F controller provides a "Clear Group" signal to the JCF calculator in order to clear the calculator for the next group by advancing the JCF within the calculator to output register 28R.

INDUSTRIAL APPLICABILITY

It will be apparent to those skilled in the art that the objects of this invention have been achieved as described hereinbefore.

CONCLUSION

Clearly various changes may be made in the structure and embodiments shown herein without departing from the concept of the invention. Further, features of the embodiments shown in the various Figures may be employed with the embodiments of the other Figures.

Therefore, the scope of the invention is to be determined by the terminology of the following claims and the legal equivalents thereof.

We claim as our invention:

1. A character selection agent receiving input character codes (ICCs) from a plurality of OCR processors and for selecting the mathematically most probable code (MPC) from among the plurality of ICCs based on a confidence factor (CF) associated with each ICC, comprising:

input register having a plurality of input positions for receiving the ICCs and the associated CFs;

sort means for sorting the ICCs into groups of identical codes;

sort memory for storing the groups of sorted ICCs at memory locations within the sort memory;

joint confidence factor (JCF) calculator for determining the JCF of each group of identical codes based on the CFS of the ICCs in each group;

advance means for advancing each group of ICCs in the sort memory to the JCF calculator for determination of the group JCF; and output register for receiving the JCFs from the JCF calculator and selecting the MPC based on the relative JCFs.

2. The character selection agent of claim 1, wherein the advance means further comprises:

addressing means for sequentially accessing the sorted ICCs in the sort memory means for providing a sorted stream of ICCs; and group detector for monitoring the ICC stream to activate the JC calculator to execute the JCF calculation and to clear the JCF calculator at the end of each group of identical ICCs.

3. The character selection agent of claim 2, wherein:

the ICC groups are stored at sequential locations in the sort memory; and the addressing means sequentially accesses the stored ICC groups.

4. The character selection agent of claim 3, wherein the group detector means further comprises:

T/F comparator for receiving the lead ICC in each group and comparing the lead ICC to the subsequent ICCs in the ICC stream to determine if the comparison is true (T) or false (F).

5. The character selection agent of claim 4, wherein the T/F comparator comprises:

a dominant side for receiving the lead ICC in each group; and a non-dominant side for receiving the subsequent ICCs.

6. The character selection agent of claim 5, wherein the group detector further comprises:

T/F controller responsive to the T/F comparator for advancing a subsequent ICC from the non-dominant side of the comparator to the JCF calculator when the comparison is true, advancing the lead ICC in the dominant side of the T/F comparator to the JCF calculator when the comparison is false shifting the subsequent ICC from the non-dominant side of the T/F comparator to the dominant side when the comparison is false.

7. The character selection agent of claim 6, wherein the addressing means is incremented in response to the advancing of the T/F controller for accessing the next location in the sort memory to provide the sorted stream of ICCs into the T/F comparator.

8. The character selection agent of claim 1, wherein the ICCs are formatted by data fields, comprising:
a character data field containing a binary character code of the ICC; and
a CF data field containing a binary value of the CF for the character code contained in the character field.

9. The character selection agent of claim 8, wherein the CF data field contains probability of correctness (P) data, and the output register contains joint probability (JP) data.

10. The character selection agent of claim 8, wherein the CF data field contains probability of error (e) data, and the output register contains joint error product (JeP) data.

11. The character selection agent of claim 8, wherein the data field format of each ICC further comprises:
a processor data field identifying which individual OCR processor from the plurality of OCR processors provided the ICC.

12. The character selection agent of claim 8, wherein the data field format of each ICC further comprises:
a text control field containing text control codes.

13. The character selection agent of claim 8, wherein the data field format of each ICC further comprises:
default image field containing a processor address of an image for the binary character code in the character data field.

14. The character selection agent of claim 13, wherein the input register has image bit map memories for receiving the character code images from the OCR processors.

15. The character selection agent of claim 14, wherein the output register has image bit map memories for receiving the character code images from the input register.

16. The character selection agent of claim 1, wherein the input register further comprises:
N registers having input positions for receiving N ICCs corresponding to N character images processed by the OCR processors; and
C positions within each register for receiving C choices of ICC from the N character images.

17. The character selection agent of claim 1, wherein the output register further comprises:
J output positions for storing J JCFs from the JCF calculator.

18. The character selection agent of claim 1, wherein the JCF calculator determines the JCF of each group of n identical codes based on the relationship:

$$JCF_n = 1 - (1-CF_1)(1-CF_2)\ldots(1-CF_n).$$

19. The character selection agent of claim 18, wherein the CF values are calibrated and are equal to the probability (P) of correctness of the ICCs.

20. The character selection agent of claim 19, wherein the JCF calculator means determines the joint probability (JP) of each group of n identical codes based on the relationship:

$$JP_n = 1 - (1-P_1)(1-P_2)\ldots(1-P_n).$$

21. The character selection agent of claim 20, wherein the JCF calculator determines the joint probability (JP) of each group of n identical codes based on the relationship:

$$JP_n = 1 - (e_1)(e_2)(e_3)\ldots(e_n),$$

where e is the probability of error and is determined by the relationship "P+e=1".

22. The character selection agent of claim 21, wherein the JCF calculator determines the joint probability (JP) of each group of n identical codes based on the relationship:

$$JP_n = 1 - Jep_n$$

where $Jep_n$ is the product of the e terms.

23. The character selection agent of claim 1, wherein:
the input register has a first position and a last position, and
the sort means sorts the ICCs from the input register into the sort memory in the order of the first position in the input register through to the last position in the input register.

24. The character selection agent of claim 1, wherein:
the sort register sorts the ICCs from the input means into the sort memory in the order of the ICC with the highest CF through to the ICC with the lowest CF.

* * * * *